US007912894B2

(12) United States Patent
Adams

(10) Patent No.: US 7,912,894 B2
(45) Date of Patent: Mar. 22, 2011

(54) COMPUTERIZED, COPY-DETECTION AND DISCRIMINATION APPARATUS AND METHOD

(76) Inventor: Phillip M. Adams, Henderson, NV (US)

( * ) Notice: Subject to any disclaimer, the term of this patent is extended or adjusted under 35 U.S.C. 154(b) by 914 days.

(21) Appl. No.: 11/748,718

(22) Filed: May 15, 2007

(65) Prior Publication Data
US 2008/0288653 A1 Nov. 20, 2008

(51) Int. Cl.
G06F 15/16 (2006.01)
G06F 21/00 (2006.01)
G06F 7/04 (2006.01)
G06F 17/30 (2006.01)

(52) U.S. Cl. ............... 709/201; 705/57; 705/51; 705/50; 705/904; 705/908; 705/911; 380/201; 380/203; 726/32; 726/26

(58) Field of Classification Search .................. 709/201; 705/57, 51, 50, 904, 908, 911; 380/201, 380/203; 726/32, 26
See application file for complete search history.

(56) References Cited

U.S. PATENT DOCUMENTS

| 5,621,454 | A | * | 4/1997 | Ellis et al. .................. 725/22 |
| 5,630,060 | A | * | 5/1997 | Tang et al. .................. 709/238 |
| 5,983,351 | A | | 11/1999 | Glogau |
| 6,445,822 | B1 | * | 9/2002 | Crill et al. .................. 382/218 |
| 6,684,254 | B1 | | 1/2004 | Dutta |
| 6,963,975 | B1 | | 11/2005 | Weare |
| 6,973,574 | B2 | * | 12/2005 | Mihcak et al. .................. 713/180 |
| 7,051,203 | B1 | * | 5/2006 | Smith .................. 713/168 |
| 7,152,163 | B2 | * | 12/2006 | Mihcak et al. .................. 713/180 |
| 7,174,293 | B2 | * | 2/2007 | Kenyon et al. .................. 704/231 |
| 7,188,065 | B2 | * | 3/2007 | Mihcak et al. .................. 704/270 |
| 7,194,752 | B1 | * | 3/2007 | Kenyon et al. .................. 725/22 |
| 7,236,610 | B1 | * | 6/2007 | Luo et al. .................. 382/100 |
| 7,239,703 | B2 | * | 7/2007 | Higurashi et al. .................. 380/203 |
| 7,249,383 | B1 | * | 7/2007 | McCully et al. .................. 726/28 |
| 7,333,864 | B1 | * | 2/2008 | Herley .................. 700/94 |
| 7,340,386 | B2 | * | 3/2008 | Pal et al. .................. 703/14 |
| 7,363,277 | B1 | * | 4/2008 | Dutta et al. .................. 705/57 |
| 7,424,747 | B2 | * | 9/2008 | DeTreville .................. 726/32 |
| 7,516,074 | B2 | * | 4/2009 | Bilobrov .................. 704/270 |
| 7,543,024 | B2 | * | 6/2009 | Holstege .................. 709/206 |
| 7,565,327 | B2 | * | 7/2009 | Schmelzer .................. 705/67 |
| 7,599,927 | B2 | * | 10/2009 | Lebrat .................. 1/1 |
| 7,653,210 | B2 | * | 1/2010 | Rhoads .................. 382/100 |
| 7,711,652 | B2 | * | 5/2010 | Schmelzer .................. 705/67 |
| 7,765,598 | B2 | * | 7/2010 | Liu .................. 726/26 |
| 2002/0023020 | A1 | * | 2/2002 | Kenyon et al. .................. 705/26 |

(Continued)

FOREIGN PATENT DOCUMENTS

EP 0838960 4/1998

Primary Examiner — Dohm Chankong
(74) Attorney, Agent, or Firm — Pate Baird, PLLC

(57) ABSTRACT

An engine identifying segments or portions of one source material or source file common to or found in another source material or file. The engine may receive a first data stream in binary form as well as a second stream in binary form. The engine may include a data stream processor or pre-processor programmed to translate the first and second data streams to generate respective first and second processed data streams. The commonality between the first and second processed data streams may be greater than the commonality between the first and second data streams themselves. Also, a comparator may be programmed to compare the first and second process data streams and identify binary segments found in both the first and second processed data streams.

19 Claims, 8 Drawing Sheets

U.S. PATENT DOCUMENTS

| | | | |
|---|---|---|---|
| 2003/0026422 A1* | 2/2003 | Gerheim et al. | 380/210 |
| 2003/0037010 A1* | 2/2003 | Schmelzer | 705/67 |
| 2003/0191764 A1* | 10/2003 | Richards | 707/100 |
| 2004/0093202 A1* | 5/2004 | Fischer et al. | 704/216 |
| 2004/0133927 A1* | 7/2004 | Sternberg et al. | 725/136 |
| 2004/0172240 A1 | 9/2004 | Crockett et al. | |
| 2005/0021539 A1* | 1/2005 | Short et al. | 707/100 |
| 2005/0154680 A1* | 7/2005 | Schmelzer | 705/67 |
| 2005/0154681 A1* | 7/2005 | Schmelzer | 705/67 |
| 2005/0198505 A1* | 9/2005 | Smith | 713/168 |
| 2006/0080356 A1* | 4/2006 | Burges et al. | 707/103 R |
| 2006/0167803 A1 | 7/2006 | Aydar et al. | |
| 2007/0083370 A1 | 4/2007 | Scarano et al. | |
| 2007/0271253 A1* | 11/2007 | Lebrat | 707/5 |
| 2007/0274537 A1* | 11/2007 | Srinivasan | 381/94.3 |
| 2008/0072335 A1* | 3/2008 | David et al. | 726/30 |
| 2008/0271592 A1* | 11/2008 | Beckford | 84/645 |

\* cited by examiner

COMPUTERIZED, COPY-DETECTION AND DISCRIMINATION APPARATUS AND METHOD

BACKGROUND

1. The Field of the Invention

This invention relates to computerized detection and enforcement tools for protection of intellectual property rights and, more particularly, to novel systems and methods for detecting unauthorized copying of intellectual property.

2. The Background Art

In certain situations, it is a relatively simple endeavor to determine when another is copying or otherwise infringing on one's intellectual property rights. For example, if one were an owner of a patent, one might find in the market place and purchase the product of a potential infringer. That product may then be compared at the convenience of the patent owner against the patent owner's claims. Similarly, if one has a copyrighted work one may often purchase the works or publications of another and compare them to determine whether copyright infringement has occurred.

However, certain materials may not lend themselves to a simple determination of patent infringement, copyright infringement, or other intellectual property violation. For example, a particular software package completed and provided in an executable form will typically not identify the source code from which the executable was derived. Such source code is typically only obtained after litigation has been initiated and the source material or source code has been produced in discovery. Discovery proceedings often occur later as opposed to earlier in a lawsuit, and virtually never before. Accordingly, one may not discover whether or not a new issue of copyright infringement of intellectual property has occurred until much effort (read: money) has been expended in the suit.

Similarly, for other digital media such as sound recordings, different sampling techniques and modifications may mask the fact that one recording originates in another recording or other work protected by copyright registrations or the like. Also, in certain applications, the sheer volume of electronic applications being transferred does not lend itself to ready examination or comparison to identify the details of the content of that traffic. A prodigious effort would be required to determine whether that content represents a misappropriation or other violation of some intellectual property right. As a result, significant violations of intellectual property rights may pass undetected.

Accordingly, what is needed is a system providing rapid analysis of digital traffic or data streams to provide information regarding mathematically recognizable patterns in the content thereof. In particular, one needs automated review for assessing violations of the intellectual property rights of others. Additionally, what is needed is a method of reducing or translating digital content to a common dominator or simplified structural form so that it may be readily compared to other similarly reduced, transformed, or translated material. Such a system may enable and improve online detection and enforcement of intellectual property rights in the digital area where massive volumes of data pass through servers, undetectable except in the most blatant and obvious cases.

BRIEF SUMMARY OF THE INVENTION

In view of the foregoing, in accordance with the invention as embodied and broadly described herein, a method and apparatus are disclosed in one embodiment of the present invention as including an engine receiving source material or source files, processing that source material, and producing a useful output therefrom. In general, source material may be any binary data stream. An engine may be configured to identify segments or portions of one source common to, or also found in, another source. Such commonality may occur when two or more sources share a common origin. Accordingly, an engine may assist in protecting and enforcing intellectual property rights in source material In selected embodiments, an engine may include one or more pre-processors, comparators, post-processors, user interfaces, and databases. A pre-processor may be configured to reduce source material to its "common denominator." That is, source material may be of a similar type, yet be dissimilar in form. Accordingly, a pre-processor may work to translate both multiple materials or files to a common form to facilitate direct comparison one against the other.

A comparator may be configured to identify segments common to more than one source. For example, a comparator may identify all segments comprising at least a certain length common to both a first source and a second source. A post-processor may be configured to convert the information obtained by the comparator into the output desired by the user. For example, a post processor may generate a report listing the segments identified by the comparator.

A user interface may be configured to support interaction between a user and the other components of an engine. For example, through a user interface, a user may dictate the minimum length for segments identified by the comparator. In selected embodiment, certain information may be passed directly from one component to another. Alternatively, a database may be configured to store and recall information used by the components of an engine. For example, a database may store one or more processed data streams generated by a pre-processor.

BRIEF DESCRIPTION OF THE DRAWINGS

The foregoing features of the present invention will become more fully apparent from the following description and appended claims, taken in conjunction with the accompanying drawings wherein like structures are identified by like numerals throughout. Understanding that these drawings depict only typical embodiments of the invention and are, therefore, not to be considered limiting of its scope, the invention will be described with additional specificity and detail through use of the accompanying drawings in which:

DETAILED DESCRIPTION OF THE PREFERRED EMBODIMENTS

Figure 1:
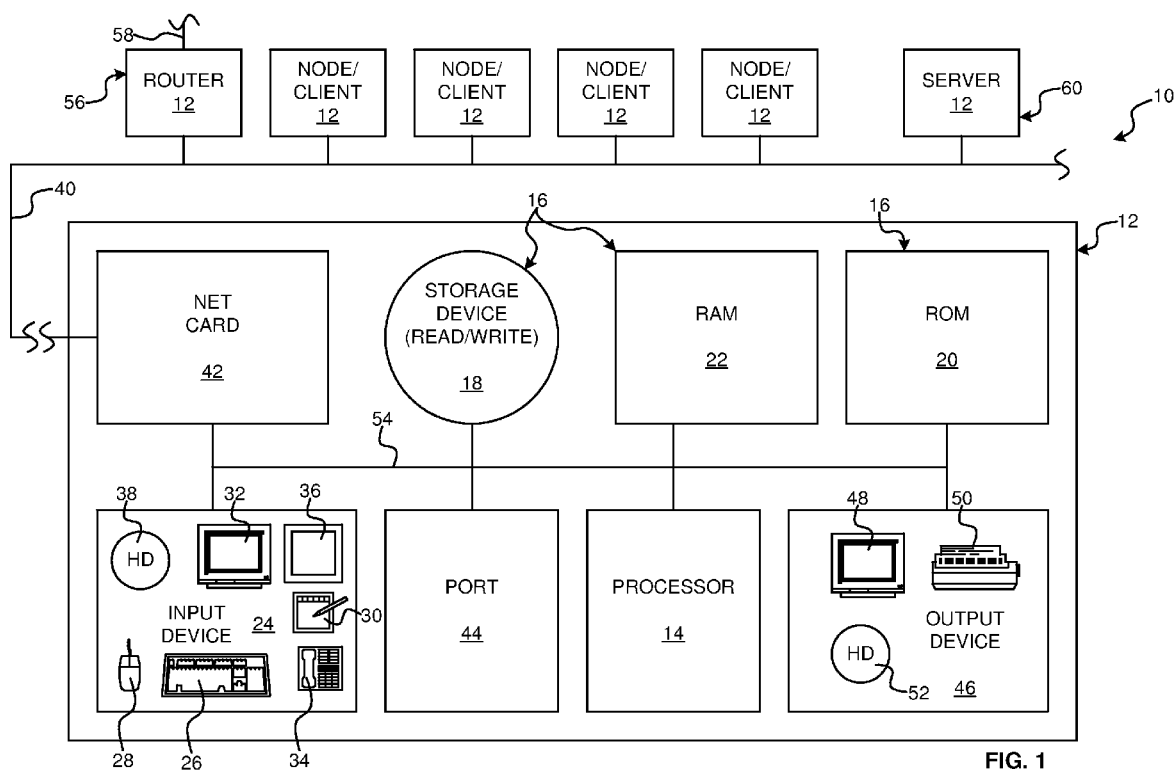
FIG. 1 is a schematic block diagram of one embodiment of a computer system implementing an apparatus and method in accordance with the present invention.

It will be readily understood that the components of the present invention, as generally described and illustrated in the drawings herein, could be arranged and designed in a wide variety of different configurations. Thus, the following more detailed description of selected embodiments of a system and method implemented in accordance with the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, an apparatus 10 or system 10 for implementing the present invention may include one or more nodes 12 (e.g., clients 12, computers 12). Such nodes 12 may contain one or more processors 14 or CPU's 14. A CPU 14 may be operably connected to a memory device 16. A memory device 16 may include one or more devices such as a hard drive 18 or other non-volatile storage device 18, a read-only memory 20 (ROM 20), and a random access (and usually volatile) memory 22 (RAM 22 or operational memory 22). Such components 14, 16, 18, 20, 22 may exist in a single node 12 or may exist in multiple nodes 12 remote from one another.

In selected embodiments, the apparatus 10 may include an input device 24 for receiving inputs from a user or from another device. Input devices 24 may include one or more physical embodiments. For example, a keyboard 26 may be used for interaction with the user, as may a mouse 28 or stylus pad 30. A touch screen 32, a telephone 34, or simply a telecommunications line 34, may be used for communication with other devices, with a user, or the like. Similarly, a scanner 36 may be used to receive graphical inputs, which may or may not be translated to other formats. A hard drive 38 or other memory device 38 may be used as an input device whether resident within the particular node 12 or some other node 12 connected by a network 40. In selected embodiments, a network card 42 (interface card) or port 44 may be provided within a node 12 to facilitate communication through such a network 40.

In certain embodiments, an output device 46 may be provided within a node 12, or accessible within the apparatus 10. Output devices 46 may include one or more physical hardware units. For example, in general, a port 44 may be used to accept inputs into and send outputs from the node 12. Nevertheless, a monitor 48 may provide outputs to a user for feedback during a process, or for assisting two-way communication between a processor 14 and a user. A printer 50, a hard drive 52, or other device may be used for outputting information as output devices 46.

Internally, a bus 54, or plurality of buses 54, may operably interconnect a processor 14, memory devices 16, input devices 24, output devices 46, network card 42, and port 44. The bus 54 may be thought of as a data carrier. As such, the bus 54 may be embodied in numerous configurations. Wire, fiber optic line, wireless electromagnetic communications by visible light, infrared, and radio frequencies may likewise be implemented as appropriate for the bus 54 and the network 40.

In general, a network 40 to which a node 12 connects may, in turn, be connected through a router 56 to another network 58. In general, nodes 12 may be on the same network 40, adjoining networks (i.e., network 40 and neighboring network 58), or may be separated by multiple routers 56 and multiple networks as individual nodes 12 on an internetwork. The individual nodes 12 may have various communication capabilities. In certain embodiments, a minimum of logical capability may be available in any node 12. For example, each node 12 may contain a processor 14 with more or less of the other componentry described hereinabove.

A network 40 may include one or more servers 60. Servers 60 may be used to manage, store, communicate, transfer, access, update, and the like, any practical number of files, databases, or the like for other nodes 12 on a network 40. Typically, a server 60 may be accessed by all nodes 12 on a network 40. Nevertheless, other special functions, including communications, applications, directory services, and the like, may be implemented by an individual server 60 or multiple servers 60.

In general, a node 12 may need to communicate over a network 40 with a server 60, a router 56, or other nodes 12. Similarly, a node 12 may need to communicate over another neighboring network 58 in an internetwork connection with some remote node 12. Likewise, individual components may need to communicate data with one another. A communication link may exist, in general, between any pair of devices.

Figure 2:
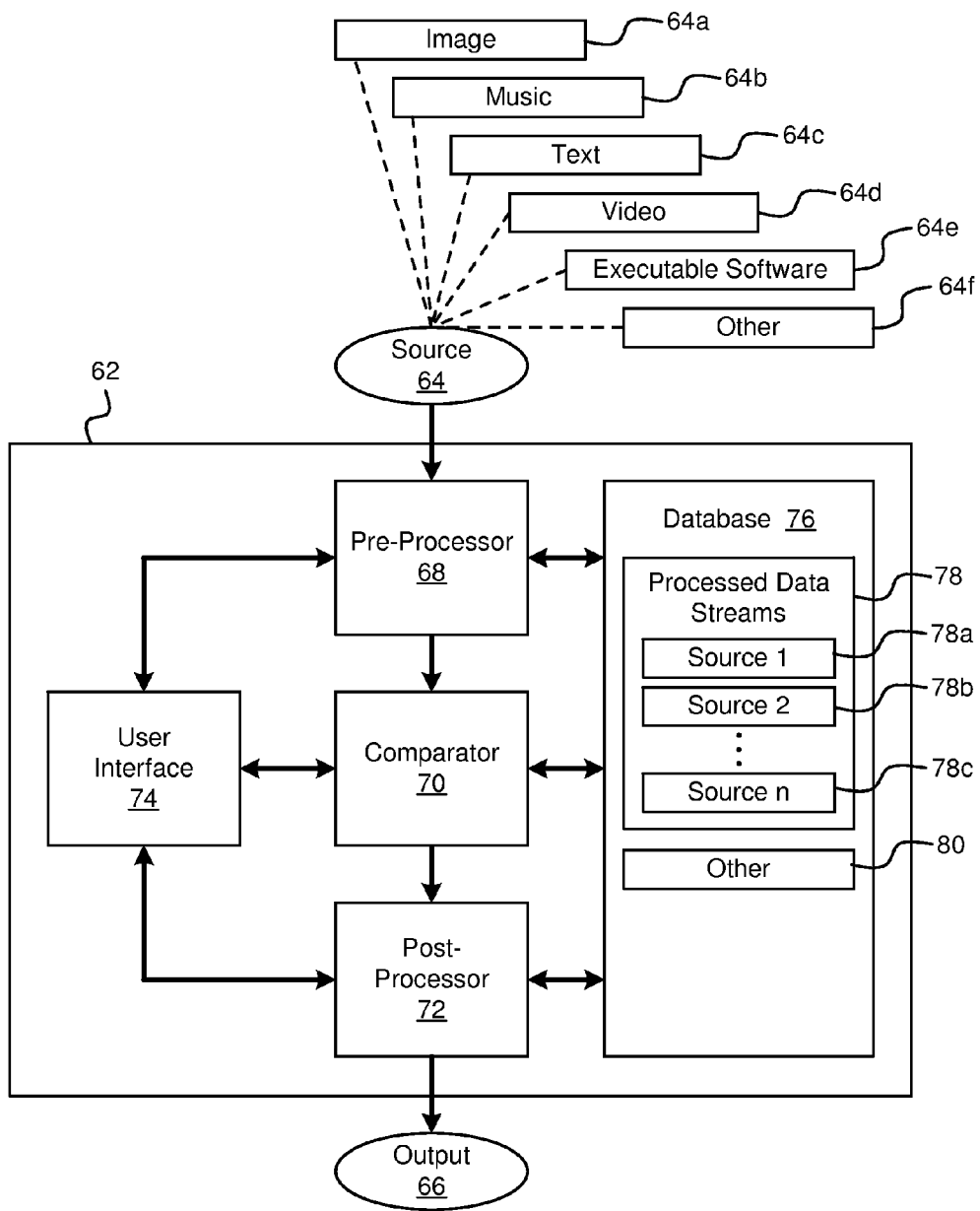
FIG. 2 is a schematic block diagram of an intellectual property enforcement engine or "discrimination engine" in accordance with the present invention.

Referring to FIG. 2, an apparatus 10 may support a discrimination engine 62, simply referred to as an engine 62, in accordance with the present invention. An engine 62 may receive source material 64 and process that source material 64 to produce a useful output 66 therefrom, for example, discriminating patterns otherwise not readily detectable. In general, source material 64 may be any binary data stream. For example, source material 64 may be image data 64a, music 64b, text 64c, video 64d, executable software 64e, or some other 64f data represented as a binary data stream.

An engine 62 in accordance with the present invention may be configured to identify patterns of the actual content of segments or portions of one source 64 common to, or also found in, another source 64. Such commonality may occur when two or more sources 64 share a common origin. Accordingly, in selected embodiments, an engine 62 in accordance with the present invention may assist in protecting and enforcing intellectual property rights in source material 64.

For example, an engine 62 may determine when one executable software program 64e or file 64e derived or copied from some portion or portions of another executable software program 64e or file 64e. Once such a link is established, appropriate action may be taken to protect the underlying executable software 64e and end any improper use thereof by an unauthorized party.

In selected embodiments, an engine 62 may include one or more pre-processors 68, comparators 70, post-processors 72, user interfaces 74, and databases 76. While the functionality between the various components 68, 70, 72, 74, 76 of an engine 62 may vary, each component 68, 70, 72, 74, 76 may be any arrangement or combination of hardware, software, or hardware and software configured to provide that desired functionality In general, a pre-processor 68 may be configured to reduce source material 64 to its "common denominator." That is, source material 64 may be of a similar type, yet be dissimilar in actual form. For example, a first music file 64a may be a digital recording of a particular performance taken at a particular sampling frequency. A second music file 64a may originate with that same digital recording of the same performance, but be compressed or sampled at a different frequency. Accordingly, a pre-processor 68 may operate to translate both the first and second files 64a to a common form (e.g., compression, frequency, and the like) to facilitate direct comparison one against the other.

A comparator 70 may be configured to detect and identify segments common to more than one source 64. For example, a comparator 70 may identify all common segments comprising at least a certain selected length (e.g., number of bytes) found to be common to both a first source 64e and a second source 64e. Thus, no need for source code or human comparison may be required.

A post-processor 72 may be configured to convert the information obtained by the comparator 70 into the output 66 desired by the user. For example, a post processor 72 may generate a report listing the common segments identified by the comparator 70. As a particular matter, a post-processor 72 may facilitate more aggressive assertion and protection of intellectual property rights. In general, the capability of the post-processor 72 may vary according to the sophistication or complexity of the output 66 desired by the user.

A user interface 74 may be configured to support interaction between a user and the other components 68, 70, 72, 76 of an engine 62. For example, through a user interface 74, a user may dictate a minimum length for segments to be tested and identified by the comparator 70. Larger segments may be easier to detect or discriminate rapidly. Shorter segments may provide a more thorough survey. Through a user interface 74, a user 74 may dictate the format, presentation, visualization, or other type of output 66 generated by the post-processor 72. Similarly, through a user interface 74, a pre-processor 68 may inform a user of the various "translation" or transformation procedures applied to "reduce" the source material 64 to a more useful, comparable, or other desired form.

In selected embodiments, certain information may be passed directly from one component to another. For example, upon completion of its work, a pre-processor 68 may pass a processed data stream 78 to a comparator 70. The comparator 70 may then hold the processed data stream 78 until it receives another processed data stream 78 suitable for conducting a comparison.

Alternatively, a database 76 may be configured to store and recall information 78, 80 used by the components 68, 70, 72, 74 of an engine 62. For example, a database 76 may store one or more processed data streams 78 generated by a preprocessor 68. Accordingly, comparator 70 may compare the one or more previously processed sources 78a, 78b, 78n to identify common segments.

In still other embodiments, certain information may be passed from component to component (e.g., from pre-processor 68 to comparator 70), while other information is stored in a database 76. For example, upon completion of its processing, a pre-processor 68 may pass its output as a processed data stream 78 to a database 68 for storage and recall. The pre-processor 68 may then output data suitable to point or otherwise inform a comparator 70 of the location of the new processed data stream 78 in a memory location, file, register, buffer, or the like. Accordingly, the comparator 70 may compare the new processed data stream 78 with others 78 previously identified and stored in some memory location, file, or the like inside or indicated by the database 76.

In general, any information used by the engine 62 may be stored in or identified by data in a database 76. In addition to the processed data streams 78, other information 80 stored in a database 76 may include common segments identified by a comparator 70, reports generated by an post-processor 72, default settings received from a user through a user interface 74, and the like.

Figure 3:
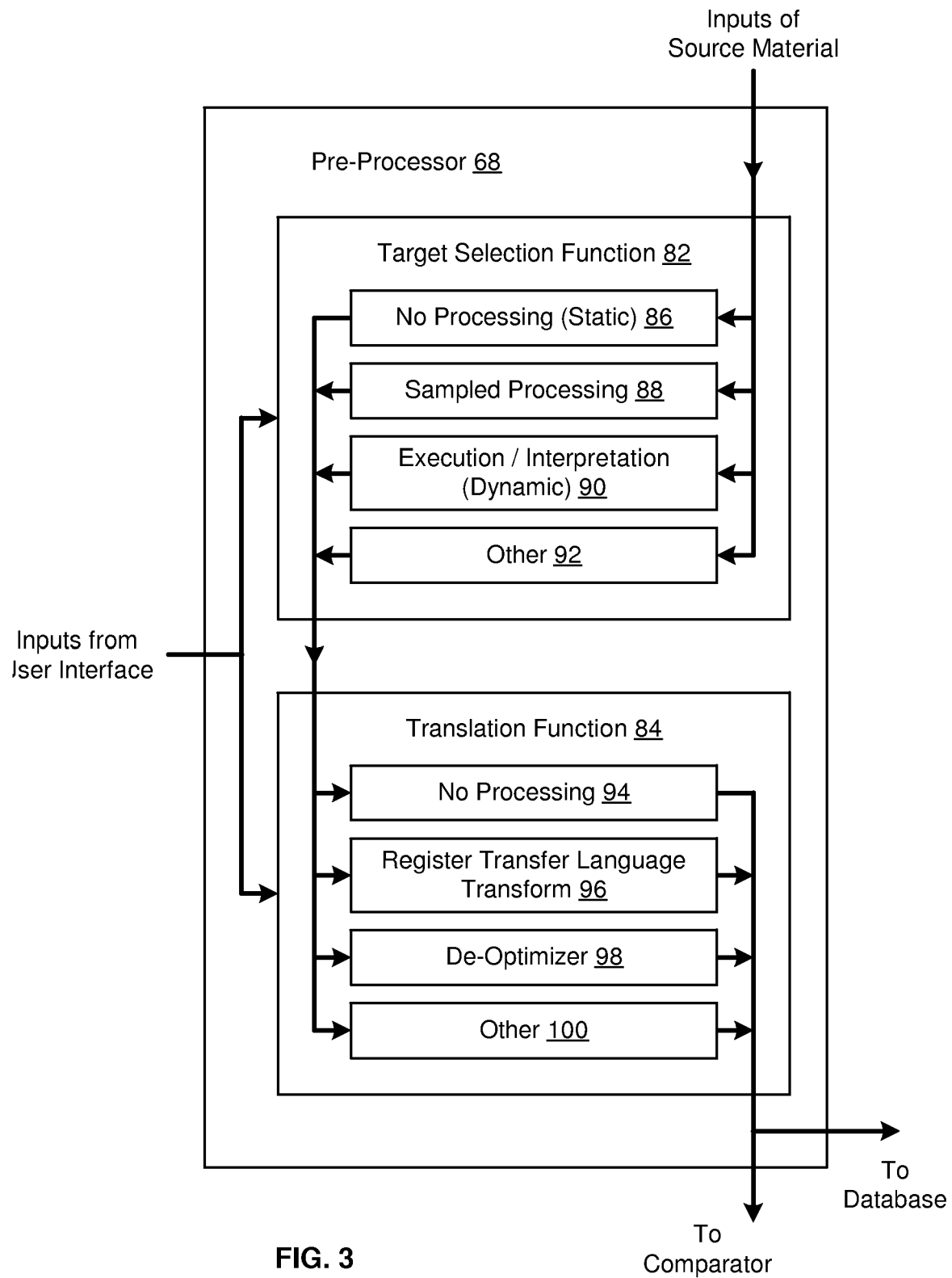
FIG. 3 is a schematic block diagram of one embodiment of a pre-processor of an engine in accordance with the present invention.

Referring to FIG. 3, a pre-processor 68 may be configured in any suitable manner to reduce or translate source material 64 to its "common denominator." The configuration may largely depend on the nature of the source material 64 being so transformed, reduced, or translated. The configuration may also depend on whether the engine 62 processes sources 64 of a single form or diverse sources 64 having disparate forms. Engines 62 configured to analyze diverse source materials 64 may be configured with the recognition tools and methods suited to an array of source materials 64.

In selected embodiments, a pre-processor 68 may include a target selection function 82 and a translation function 84. A target selection function 82 in accordance with the present invention may implement the desires of a user (as communicated in inputs received from a user interface 74), default settings, or the like in determining what portion of a particular source 64 is passed on for analysis and further processing. Some factors that may be considered in selecting or designing a target selection method may include the size (e.g., number of bytes) of a source file 64, processing and memory capacity of the engine 62, processing and memory capacity of various components of the engine 62 (e.g., the comparator 70), nature or fundamental characteristics of the source material 64, or the like.

For example, for certain sources 64, a pass-through option 86 may be selected or applied. In such an option 86, the target selected for analysis and further processing may be the entire source 64 in the same form in which it was received by the pre-processor 68. Such an option 86 may be described as a static selection method and may be well suited for non-executable source files 64 of relatively small size.

Alternatively, a sampling process 88 may be applied in which certain portions of the source 64 are selected for analysis and further processing. These portions, however, may be in the same form in which received by the pre-processor 68. For example, for executable software, a sampling method 88 may select a sample based on a load map corresponding thereto. In one embodiment, for example, a target selection function 82 may use a load map to select a sample avoiding all libraries or similar functions not likely to be of interest.

In other applications, a target selection function 82 may be programmed, set, or otherwise instructed to apply an execution or interpretation analysis 90 to a particular source file 64 or source material 64. Such an analysis may be considered a dynamic selection method 90. For example, executable code 64e may be executed and the resulting step-by-step instructions may be recorded. That is, the sample made for analysis and further processing may be generated by executing a data stream 64 and recording in substantially real time the processing instructions produced thereby as that sample. Such an approach may greatly expand the amount of material available for analysis and provide greater insight into the origins and functionality of source material 64 so processed.

In still other applications, other options 92 or methods 92 may be applied to select an appropriate sample for analysis and further processing. For example, a hybrid approach may be applied, combining aspects of sampling and dynamic methods 88, 90. For example, a source file 64 may be sampled according to the sampling method 88. Thereafter, those samples may be dynamically processed and recorded according to the dynamic method 90.

A translation function 84, or transformation 84 in accordance with the present invention may implement the desires of a user, default settings, or the like in determining what reduction or translation processes to apply. In general, a reduction or translation process in accordance with the present invention may be any process that reduces, transforms, or translates the sample selected by the target selection function 82 to a form in which it may be meaningfully compared to other samples of similar form and having characteristics of interest. In other words, a reduction or translation process may increase the commonality between two processed data streams above the commonality otherwise between the source materials 64 corresponding to the two processed data streams. This may be done while preserving the integrity (e.g., underlying meaning, characteristics, effect, etc.) of the source material 64.

For example, for certain sources 64, a pass-through option 94 may be selected or applied. In such an option 94, the source material 64 may be left substantially unaltered. Such an option 94 may be appropriate when a source file 64 is already in a desired form.

In selected embodiments, a translation function 84 may apply a register transfer language transform 96 or the like. A register transfer language may be used to describe operations (upon registers) caused by the execution of each instruction. When applied, a register transfer language transform 96 may tend to remove variations caused by different compilation schemes.

That is, two compilers may compile the same source code according to different schemes, resulting in two different executable software programs. This may mask the fact that both programs originated with the same source code. Application of a register transfer language transform 96 in accordance with the present invention may convert the executable software 64e into a common form independent of compilation scheme.

In certain embodiments, a translation function 84 may apply a de-optimizer 98. When applied, a de-optimizer 98 may undo any optimization embodied in a source file 64. This may be done without regard to whether the optimization originated with a compute-based optimizer or in the choices of a programmer. For example, code may be written by a programmer to contain an instruction set of "A+B=C, A+B+C=D, C+D=E." Such a set may include some optimization. That is, C+D=E would be an optimization over A+B+D=E. However, optimization software may further optimize the set by changing "A+B+C=D" to "C+C=D."

Without regard to where the various optimizations originated, a de-optimizer 98 in accordance with the present invention may reduce or translate the instruction set to provide "A+B=C, A+B+C=D, A+B+D=E." Accordingly, differences in source material 64 caused by optimization may be removed, leaving only the underlying, fundamental operations. Like factoring a polynomial, de-optimization reduces complexity to a basic, simple set of elements that compare more readily.

In still other applications, other options 100 or methods 100 may be applied to reduce the sample selected by a target selection function 82 to a form in which it may be meaningfully compared to other samples of similar form. For example, a hybrid approach may be applied, combining aspects of a register transfer language transform 96 and a de-optimizer 98. Alternatively, other methods 100 more suited for the particular source material 64 may be implemented. For example, a translation function 84 may apply a frequency transform, a compression transform, or the like.

After passing through a pre-processor 68 in accordance with the present invention, a particular source material 64 or file 64 may be characterized as a processed data stream 78 or a processed source file 78. Such processed streams 78, files, etc. may be passed to a database 76 for storage, passed to a comparator 70 for further analysis, or otherwise used or stored.

Figure 4:
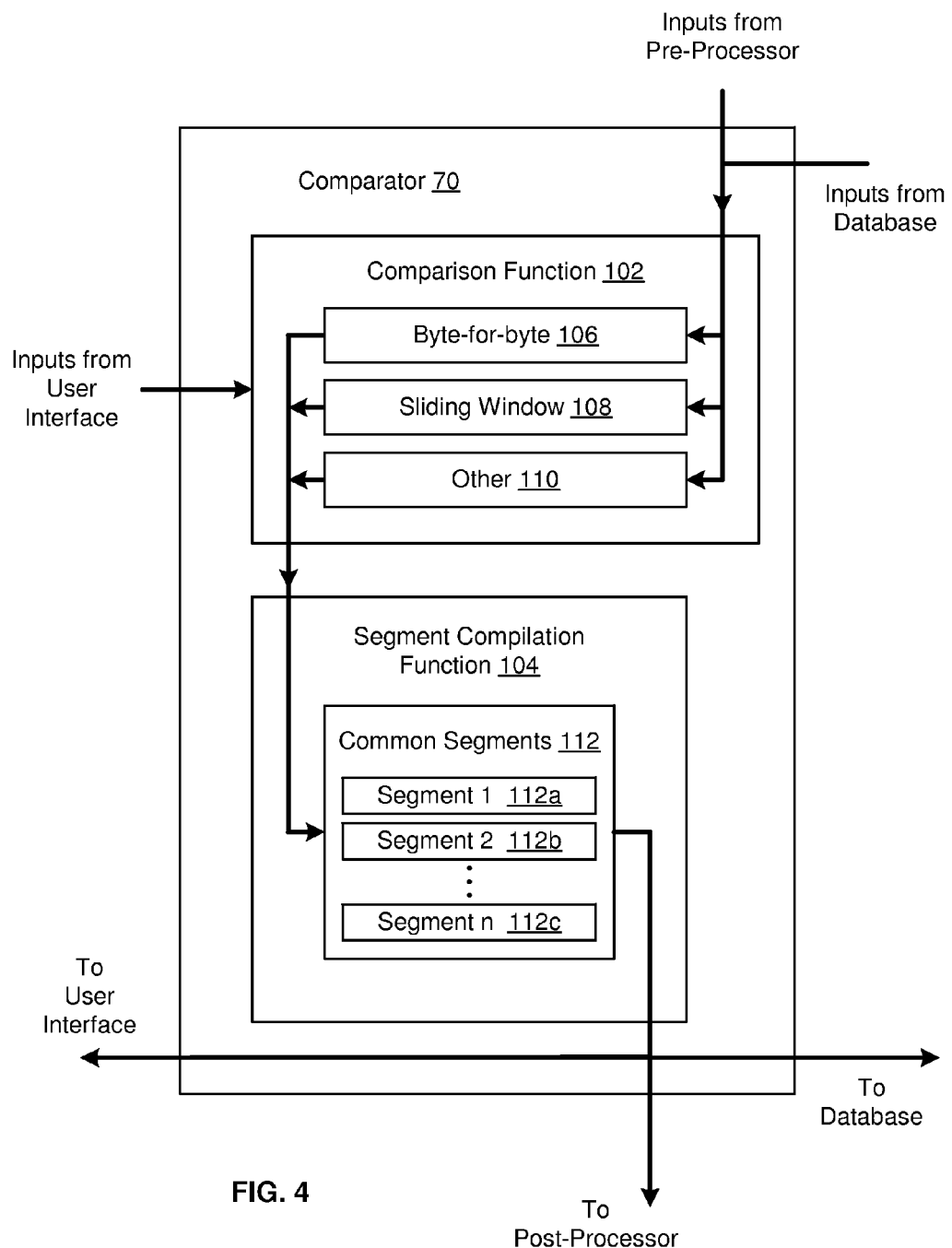
FIG. 4 is a schematic block diagram of one embodiment of a comparator of an engine in accordance with the present invention.

Referring to FIG. 4, a comparator 70 may be configured in any suitable manner to identify segments common to more than one source 64. In selected embodiments, a comparator 70 may include a comparison function 102 and a segment compilation function 104. A comparison function 102 in accordance with the present invention may implement the desires of a user, default settings, or the like in identifying segments common to more than one source 64. For example, a comparison function 102 may present a user with the option of conducting a byte-for-byte comparison 106 between two processed source materials 64. Alternatively, a comparison function 102 may support a "sliding window" comparison 108, or some other suitable comparison method 110.

In a sliding window comparison 108, a minimum segment size is determined by preprogramming, selection by a user, or the like. For example, a minimum segment size may be set at some number of bytes. The comparison function 102 may then apply a "window" covering (e.g., considering) that number of bytes to each of the processed source materials 78 being compared. The windows may then proceed to move forward, byte-by-byte, along the source materials 78.

When the contents of one window matches the contents of another window, the size of the window of comparison may be increased until the windows no longer match. Thus, the full extent of the commonality of the segments may be determined. Thereafter, the windows may be reduced to the original size and continue the byte-by-byte march to locate the next segment in common. In such a manner, all segments above a specified length that are common to the processed source materials 78 may be identified.

In selected embodiments, a segment compilation function 104 may collect all the common segments 112 (i.e., segments 112a, 112b, 112c found in each of a particular plurality of source materials 78). The common segments 112 may then be passed on to a post-processor 72, reported to the user through the user interface 74, stored in the database 76, or the like, or some combination thereof.

Figure 5:
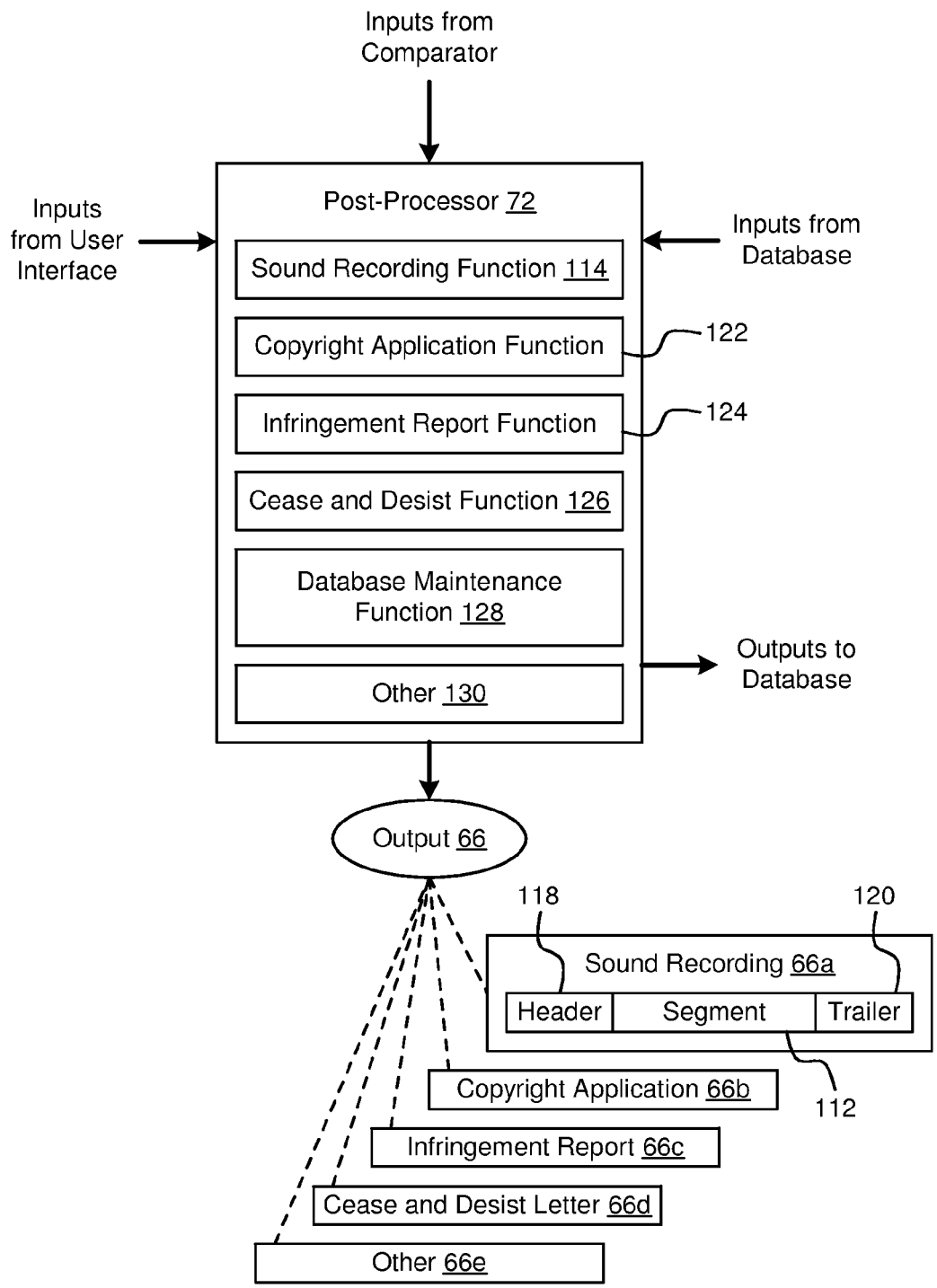
FIG. 5 is a schematic block diagram of one embodiment of a post-processor of an engine in accordance with the present invention.

Referring to FIG. 5, a post-processor 72 may be configured in any suitable manner to convert the information obtained by the comparator 70 into the output 66 desired by the user. In selected embodiments, various functions or modules may be included within a post-processor 72 to provide or generate the desired outputs 66.

For example, in one embodiment, a post-processor 72 may include a sound recording function 114. A sound recording function 114 may receive a segment 112 and generate a sound recording 66a. A segment 112 may be a segment identified by a comparator as being common or found in more than one source 78. In selected embodiments, a sound recording function 114 may create a sound recording 66a from a segment 112 by adding a header 118 and a trailer 120 identifying this segment 112 as a sound recording. For example, the header 118 and trailer 120 may instruct a reading computer or other electronic instrument to play back or otherwise treat the segment 112 as it would a sound recording.

A post-processor 72 may include a copyright application function 122. A copyright application function may receive inputs from a database or user interface and apply those inputs to a standard copyright application form corresponding to one or more countries. Accordingly, a copyright application function 122 may generate a copyright application 66b suitable for filing, or perhaps execution and filing, with the suitable authorized body for a desired country.

In other embodiments, a post-processor 72 may include an infringement report function 124. An infringement report function 124 may facilitate generation of, or generate, an infringement report 66c. An infringement report 66c may contain information listing or identifying the various segments 112 recordings 66a or sound recordings 66a that are being copied from one source material 78 to another.

In certain embodiments, a post-processor 72 may include a cease-and-desist function 126. A cease-and-desist function 126 may facilitate generation of a cease-and-desist letter 66d or other communication 66d or notice 66d. Such a letter 66d may provide a warning or otherwise inform a potential infringer of the infringement or copying of segments 112 identified by the comparator 70.

A post-processor 72 may also include a database maintenance function 128. A maintenance function 128 may pass the outputs 66 generated by post-processor 72 to a database 76 for storage. For example, a database maintenance function 128 may pass sound recordings 66a to a database 76 for storage and recall. Likewise, a database maintenance function 128 may store copyright applications 66b, infringement reports 66c, cease-and-desist letters 66d, or the like in a database 76 for future reference or use. A post-processor 72 in accordance with the present invention may include other functional features or modules 140 that provide other useful outputs 66e.

Figure 6:
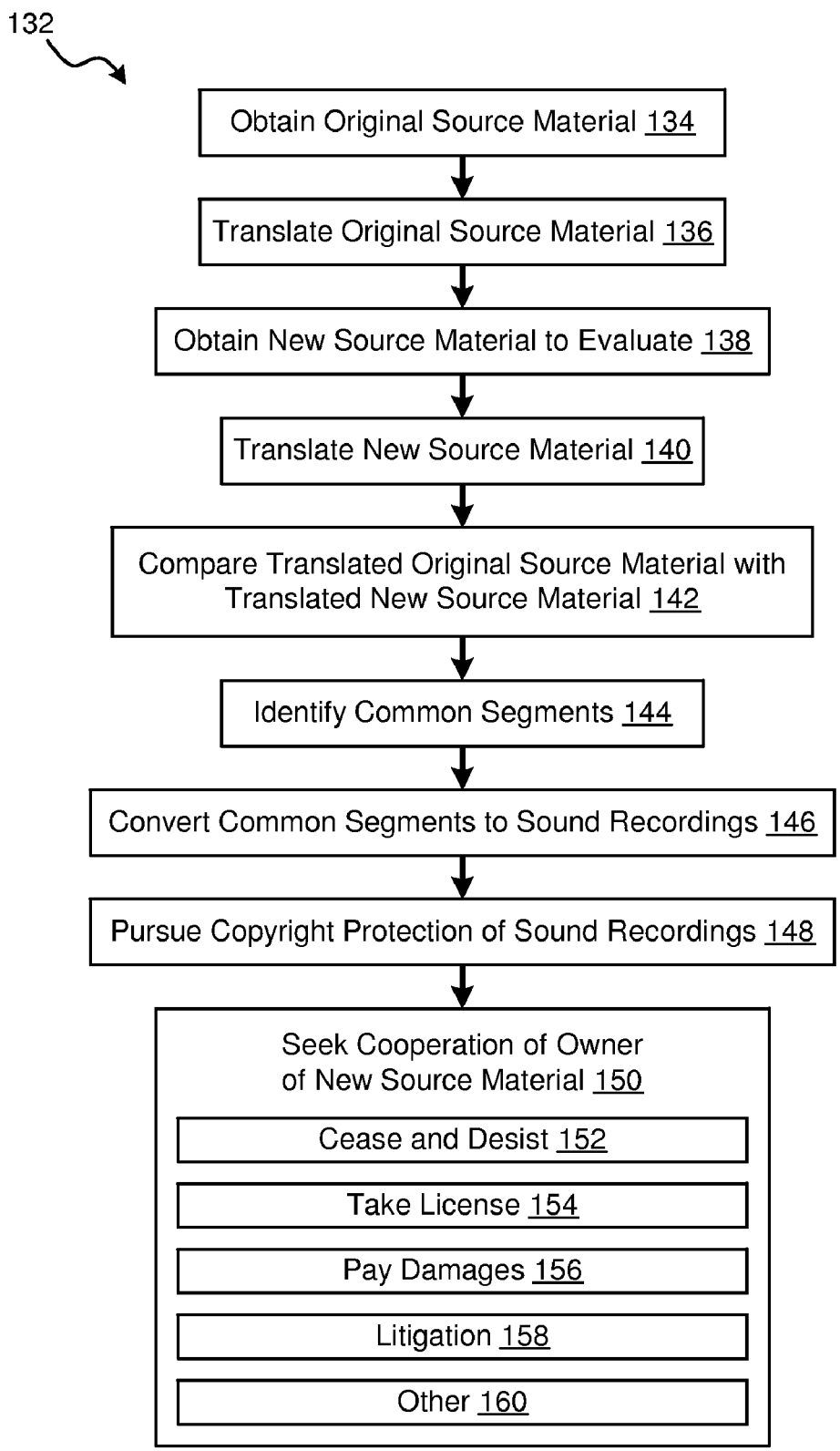
FIG. 6 is a schematic block diagram of a method for computerized copyright protection in accordance with the present invention.

Referring to FIG. 6, an engine 62 may implement a method 132 in accordance with the present invention. Such a method 132 may begin with obtaining 134 some piece of original source material 64. The source material 64 may be translated 136 to reduce the source material 64 to a form suitable for comparisons to source material 64 of other sources.

The method 132 may continue with obtaining 138 resource material 64 to evaluate. That new source material 64 may then also be translated 140. Once the original source material 64 and new source material 64 are translated they may be compared 142. The comparison process may facilitate identification 144 of common segments 112. The common segments 112 may be any part or portion of the original source material 64 also found in the new source material 64. That is, for example the common segments 112 are common to both the original source material 64 and the new source material 64.

Once the common segments 112 are identified 144, they may be converted 146 into sound recordings 66a. As sound recordings 66a, the common segments 112 may be the subject of copyright protection. Accordingly, an engine 62 operating on behalf of an operator or user, may pursue 148 copyright or other protection of the sound recordings 66a. Once copyright or other protection of the sound recording 66a is obtained, the protection may be enforced against the creator or user of new source material 64.

For example, the owner or licensee of the original source material 64 may have an action for copyright infringement against the owner or licensee of the new source material 64. Accordingly, the owner or licensee of the original source material 64 may seek 150 the cooperation of the owner of the new source material 64.

The cooperation of the owner of the new source material may be sought 150 in a number of ways. For example, cooperation may be sought 150 through a cease-and-desist letter 152, through an offer to take a license 154, through a request to pay damages 156, through litigation 158 in federal or state courts, or the like, or through some other 160 mechanism, tribunal, or the like.

Figure 7:
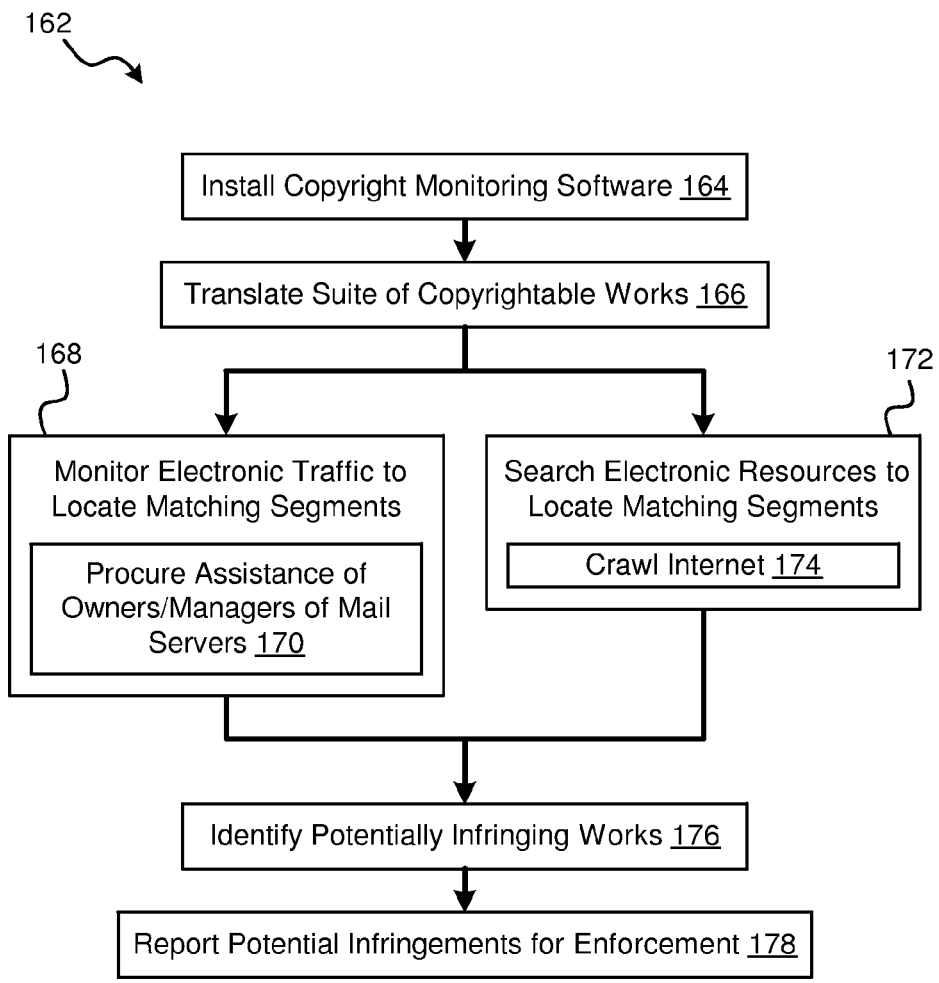
FIG. 7 is a schematic block diagram of an alternative method for computerized protection of intellectual property rights in accordance with the present invention.
Figure 8:
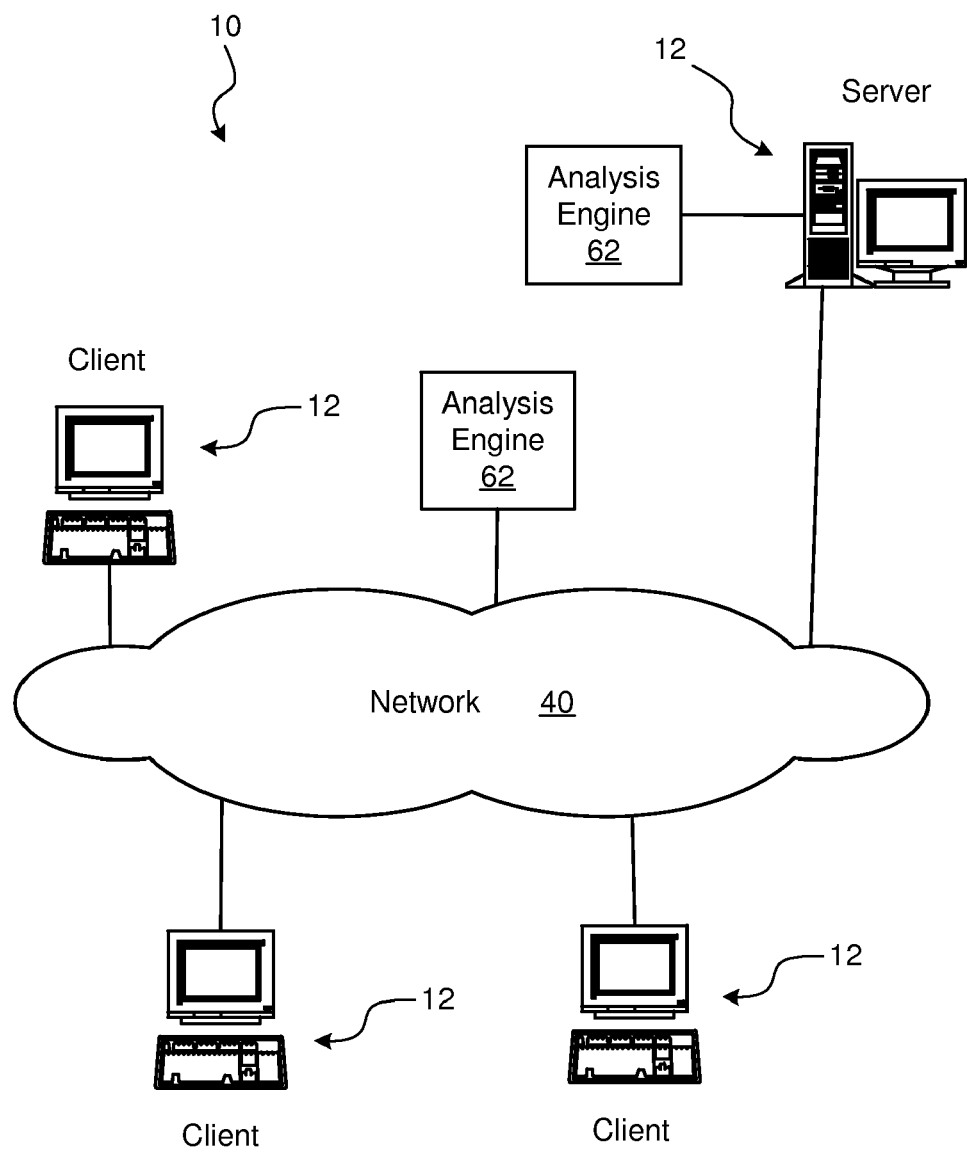
FIG. 8 is a schematic block diagram illustrating some of the locations where one embodiment of an engine, in accordance with the present invention, may be applied to a computer network.

Referring to FIGS. 7 and 8, an engine 62 in accordance with the present invention may be used to monitor traffic passing through a server 12, network 40, or the like. For example, in one method 162 in accordance with the present invention, copyright monitoring software may be installed 164 on a computer attached to or otherwise monitoring a server 12 or a network 40. The software may translate 166 a suite of copyrightable works. For example, the copyright software may reduce a suite or collection of source material 64 to a simplified or processed state 78. Accordingly, one need only translate the new source material 64, or source material 64 corresponding to someone other than the owner of the original source material 64, and then compare that source 64 with the now translated 166 suite of copyrightable works.

This may be done by monitoring 168 electronic traffic to locate matching segments 112. For example, one may procure the assistance of owners or managers of mail services 170. Accordingly, the engine 62 may monitor mail traffic. In monitoring 128 such traffic, the engine 62 may identify all or a sampling of content to detect common segments 112.

Alternatively, an engine 62 in accordance with the present invention may search 172 electronic resources to locate matching segments 112. For example, this may be done by crawling the internet 174 to locate common segments 112. Common segments 112 may be found in websites, in music-sharing locations, software-downloading locations, or the like. Once common segments 112 are identified, a method 162 may continue with the identification 176 of the potentially infringing works and their owners, users, sellers, buyers, and so forth. For example, the software or engine 62 may seek information corresponding to the common segments 112 that would identify the owner thereof. Once the owners of the potentially infringing works have been identified 176, the method 162 may continue with the reporting 178 of potential infringers for enforcement action.

The present invention may be embodied in other specific forms without departing from its basic features or essential characteristics. The described embodiments are to be considered in all respects only as illustrative, and not restrictive. The scope of the invention is, therefore, indicated by the appended claims, rather than by the foregoing description. All changes that come within the meaning and range of equivalency of the claims are to be embraced within their scope.

What is claimed and desired to be secured by United States Letters Patent is:

1. A system comprising:
    a first data stream in binary form;
    a second data stream in binary form;
    a data stream processor programmed to translate the first and second data streams to generate respective first and second processed data streams, the commonality between the first and second processed data streams being greater than the commonality between the first and second data streams;
    a comparator programmed to compare the first and second processed data streams and identify binary segments common to both the first and second processed data streams;
    a post-identification data stream processor programmed to convert the binary segments into sound recording files by adding a header and trailer to the segment; and
    the post-identification data stream processor further programmed to prepare at least one copyright application petitioning copyright protection for at least one of the sound recording files.

2. The system of claim 1, wherein the first and second data streams both correspond to one of images, music, text, video, and executables.

3. The system of claim 2, wherein:
    the first and second data streams have respective sampling frequencies different from one another;

the first processed data stream comprises at least a portion of the first data stream; and the second processed data stream comprises at least a portion of the second data stream translated to a sampling frequency common to that of the first processed data stream.

4. The system of claim 2, wherein:
the data stream processor is further programmed to execute at least one method to identify first and second samples selected from the first and second data streams, respectively; and
the data stream processor is further programmed to translate the first and second samples to generate the first and second processed data streams.

5. The system of claim 4, further comprising a user interface programmed to communicate instructions from a user to the data stream processor to select which method of the at least one method is executed by the data stream processor.

6. The system of claim 5, where a first method of the at least one method comprises selecting the entire first data stream as the first sample and the entire second data stream as the second sample.

7. The system of claim 6, wherein first and second data streams comprise executable code.

8. The system of claim 7, where a second method of the at least one method comprises:
executing the first data stream and recording in real time the processing instructions executed thereby as the first sample; and
executing the second data stream and recording in real time the processing instructions executed thereby as the second sample.

9. The system of claim 8, wherein:
the first processed data stream comprises the first data stream translated into register transfer language; and
the second processed data stream comprises the second data stream translated into register transfer language.

10. The system of claim 9, wherein:
the first processed data stream comprises a de-optimized version of the first data stream; and
the second processed data stream comprises a de-optimized version of the second data stream.

11. The system of claim 1, wherein:
the first and second data streams have respective sampling frequencies different from one another;
the first processed data stream comprises at least a portion of the first data stream; and
the second processed data stream comprises at least a portion of the second data stream translated to a sampling frequency common to that of the first processed data stream.

12. The system of claim 1, wherein:
the first processed data stream comprises at least a portion of a real time recording of the processing instructions executed by executing the first data stream; and
the second processed data stream comprises at least a portion of a real time recording of the processing instructions executed by executing the second data stream.

13. The system of claim 1, wherein:
the first processed data stream comprises the first data stream translated into register transfer language; and
the second processed data stream comprises the second data stream translated into register transfer language.

14. The system of claim 1, wherein:
the first processed data stream comprises a de-optimized version of the first data stream; and
the second processed data stream comprises a de-optimized version of the second data stream.

15. The system of claim 1, further comprising a user interface programmed to communicate instructions from a user to the comparator to specify a minimum length of the binary segments identified.

16. A computer-implemented system comprising:
a first data stream represented in a binary form;
a second data stream represented in a binary form;
a data stream processor programmed to identify a first sample corresponding to the first data stream and a second sample corresponding to the second data stream;
the data stream processor further programmed to translate the first and second samples to generate respective first and second processed data streams corresponding thereto, wherein the commonality shared between the first and second processed data streams being greater than the commonality shared between the first and second data samples;
a comparator programmed to compare the first and second processed data streams and identify binary segments common to both the first and second processed data streams; and
a post-identification data stream processor programmed to convert the binary segments into sound recording files by adding a header and trailer to the segment; and
the post-identification data stream processor further programmed to prepare at least one copyright application petitioning copyright protection for at least one of the sound recording files.

17. The system of claim 16, further comprising a user interface programmed to communicate instructions from a user to the comparator to specify a minimum length of the binary segments identified.

18. A system comprising:
a first data stream in binary form;
a second data stream in binary form;
a data stream processor programmed to identify a first sample corresponding to the first data stream and a second sample corresponding to the second data stream;
the data stream processor further programmed to translate the first and second samples to generate respective first and second processed data streams, the first and second processed data streams sharing a commonality greater than that shared by the first and second data samples;
a comparator programmed to compare the first and second processed data streams and identify binary segments therein having at least a minimum length and common to both the first and second processed data streams;
a user interface programmed to communicate instructions from a user to the comparator to specify the minimum length of the binary segments identified;
a post-identification data stream processor programmed to convert the binary segments into sound recording files by adding a header and trailer to each; and
the post-identification data stream processor further programmed to prepare at least one copyright application petitioning copyright protection for at least one of the sound recording files.

19. The system of claim 18 wherein the sound recording files are digital files.

* * * * *